United States Patent
Lv et al.

(10) Patent No.: US 10,794,838 B2
(45) Date of Patent: Oct. 6, 2020

(54) METHOD AND DEVICE FOR DETECTING DEFECT OF COVER LENS IN LASER WELDING SYSTEM ON AUTOMOBILE PRODUCTION LINE

(71) Applicant: Isvision (Tianjin) Technology Co., LTD, Tianjin (CN)

(72) Inventors: Meng Lv, Tianjin (CN); Mengyu Guo, Tianjin (CN); Lei Guo, Tianjin (CN); Xiaopeng Wu, Tianjin (CN); Xianyong Chen, Tianjin (CN)

(73) Assignee: ISVISION (TIANJIN) TECHNOLOGY CO., LTD (CN)

( * ) Notice: Subject to any disclaimer, the term of this patent is extended or adjusted under 35 U.S.C. 154(b) by 211 days.

(21) Appl. No.: 16/073,241

(22) PCT Filed: Jul. 21, 2017

(86) PCT No.: PCT/CN2017/093915
§ 371 (c)(1),
(2) Date: Jul. 26, 2018

(87) PCT Pub. No.: WO2019/014937
PCT Pub. Date: Jan. 24, 2019

(65) Prior Publication Data
US 2020/0116652 A1    Apr. 16, 2020

(51) Int. Cl.
*G01N 21/94* (2006.01)
*G01N 21/47* (2006.01)
*G01N 21/55* (2014.01)

(52) U.S. Cl.
CPC ............. *G01N 21/94* (2013.01); *G01N 21/47* (2013.01); *G01N 21/55* (2013.01)

(58) Field of Classification Search
CPC .... B23K 26/032; B23K 26/082; B23K 26/22; B23K 31/125; G01J 1/42; G01J 5/00
(Continued)

(56) References Cited

U.S. PATENT DOCUMENTS 5,574,554 A * 11/1996 Su ..................... B29C 33/0055
356/124
6,292,260 B1    9/2001 Lin et al.
(Continued)

FOREIGN PATENT DOCUMENTS

CN    101089550 A    12/2007
CN    101380694 A    3/2009
(Continued)

OTHER PUBLICATIONS

Tang, Chaoguo, "Lens Defects Detection Algorithm Based on Improved Rank Transform and Segment Minimum Enclosing Rectangle", Computer & Digital Engineering vol. 34 No. 4, Apr. 2015, pp. 566-571.
(Continued)

*Primary Examiner* — Hoa Q Pham
(74) *Attorney, Agent, or Firm* — Dorsey & Whitney LLP

(57) ABSTRACT

A device for detecting a defect of a laser welding cover lens includes a coaxial light source configured to emit collimating detection light, wherein the direction of the detection light is perpendicular to a preset horizontal direction; a half transparent and half reflecting mirror arranged above the coaxial light source to reflect the detection light to a preset position; a reflecting mirror configured to reflect light from the half transparent and half reflecting mirror to the cover lens; an industrial camera parallel to the half transparent and half reflecting mirror and the reflecting mirror and configured to receive incident light from the detection light to obtain a detection image, wherein the incident light is reflected by the cover lens and passes through the reflecting mirror and the half transparent and half reflecting mirror; and a processor configured to determine whether there exists a bad point on the cover lens.

9 Claims, 10 Drawing Sheets

(58) Field of Classification Search
USPC ..... 356/124–127, 237.1–237.5, 239.1, 239.2
See application file for complete search history.

(56) References Cited

U.S. PATENT DOCUMENTS

| | | | |
|---|---|---|---|
| 6,486,942 B1* | 11/2002 | Colbourne | G01M 11/0228 356/124 |
| 8,908,167 B2* | 12/2014 | Flora | G02B 21/0016 356/237.1 |
| 2004/0114662 A1* | 6/2004 | Messler | B29C 65/8284 374/130 |
| 2013/0147946 A1 | 6/2013 | Son et al. | |
| 2015/0226675 A1 | 8/2015 | Jiang | |
| 2015/0246413 A1* | 9/2015 | Kawakita | G01J 1/42 219/121.64 |

FOREIGN PATENT DOCUMENTS

| CN | 101403822 A | 4/2009 |
|---|---|---|
| CN | 101650307 A | 2/2010 |
| CN | 101776614 A | 7/2010 |
| CN | 201903499 U | 7/2011 |
| CN | 102353680 A | 2/2012 |
| CN | 102636490 A | 8/2012 |
| CN | 103163149 A | 6/2013 |
| CN | 104076039 A | 10/2014 |
| CN | 104931505 A | 9/2015 |
| CN | 106053479 A | 10/2016 |

OTHER PUBLICATIONS

Wei, Kang, "Shading directional mirror for coaxial light source photography", Journal of Chinese People's Public Security University (Science and Technology) vol. 2 No. 2, 2012, pp. 10-15.
Yao, Hong-Bing et al., "Automatic defect inspection system for spectacle lenses", Journal of Applied Optics vol. 34 No. 4, Jul. 2013, pp. 633-638.
Yao, Tairan, "Research on Mobile Phone Lens Sorting System Based on Machine Vision", Huazhong University of Science and Technology; Wuhan China, Jan. 28, 2013, 20 pages.

* cited by examiner

METHOD AND DEVICE FOR DETECTING DEFECT OF COVER LENS IN LASER WELDING SYSTEM ON AUTOMOBILE PRODUCTION LINE

TECHNICAL FIELD

The disclosure relates to the field of laser, and more particularly to a method and device for detecting a defect of cover lens in a laser welding system on an automobile production line.

BACKGROUND

In four major production processes of stamping, welding, coating and assembling for automobile production, welded body quality involves appearance, quality and difficulties in assembling of a body, so that the welding production process serves as a connecting link between the preceding and the following in the four major processes. Compared with a conventional welding technology, laser welding has incomparable advantages in terms of welding accuracy, efficiency, reliability and automation. In recent years, along with continuous successful research and development of high-power and high-performance laser processing equipment, a laser technology is rapidly developed in the industrial fields of automobiles, energy resources, electronics and the like in developed countries such as Japan, America and Germany, and laser welding is considered as one of manufacturing technologies with broadcast development prospect in the 21st century. Along with increase of a modern automobile manufacturing demand, dependence on laser welding gets increasingly high.

However, FIG. 1 is a diagram of an inner light path of a laser welding head according to a related technology. A high temperature during a laser welding operation may produce "flying" sparks, and flying objects may be randomly adhered to a cover lens in the laser welding head to block the light path of a laser beam and reduce welding quality. For this problem, there is no good solution case at the present stage, and manual detection is usually performed by a worker on a downstream of a production line. Thus, a welding accident brought by a defect of the protection lens might be prevented by manually inspecting the cover lens of the laser welding head. However, such a manual operation has the following two problems. 1) The worker on the downstream finds a welding problem with certain lag, a worker on the production line usually inspects the whole body in white after laser welding, and when a phenomenon of bad welding caused by the fact that laser welding does not reach a standard condition during welding of the body is found, there have been multiple bodies in white with welding problems on the production line. Therefore, a large number of badly welded bodies in white require repair welding, and automobile production efficiency is reduced. Due to these problems, the bodies in white are either re-welded or directly scrapped, which virtually reduces the production efficiency and increases manufacturing cost. 2) A worker is usually not allowed to enter an automobile welding site under operation, so that the operation on the welding site is usually required to be suspended for manual inspection, which may make the whole automobile production line stagnate and further break down the whole production system.

The related technology further provides a solution that a few automobile manufacturers regularly replace cover lens at any cost no matter whether the cover lenses of welding heads have defects or not to reduce a repair rate of bodies in white. However, this still brings many problems. 1) Cost in periodic replacement of the cover lenses of the welding heads is higher than manual inspection. 2) Light paths in the laser welding heads are in a vacuum state, and frequently opening boxes for replacement of the cover lenses may bring impurities such as dust in to further influence conductivity of laser on the light paths.

For the problem of incapability in timely learning about that a cover lens is polluted during laser welding in the related technology, there is no effective solution has been proposed yet.

SUMMARY

A main purpose of the disclosure is to provide a method and device for detecting a defect of a laser welding cover lens on an automobile production line, so as to solve the problem of incapability in timely learning about that the cover lens is polluted during laser welding.

In order to achieve the purpose, according to an aspect of the disclosure, a device for detecting a defect of a laser welding cover lens on an automobile production line is provided, which includes: a coaxial light source, which is configured to emit collimating detection light, and the direction of the detection light being perpendicular to a preset horizontal direction; a half transparent and half reflecting mirror, which is arranged above the coaxial light source and configured to reflect the detection light to a preset position; a reflecting mirror, which is configure to receive the light reflected by the half transparent and half reflecting mirror and reflecting the light to the cover lens; an industrial camera, which is parallel to the half transparent and half reflecting mirror and the reflecting mirror in the preset horizontal direction and configured to receive incident light to obtain a detection image, wherein the incident light is formed from the detection light which is reflected by the cover lens and then passes through the reflecting mirror and the half transparent and half reflecting mirror; and a processor, which is configured to perform calculation according to the detection image to determine whether there exists a bad point on the cover lens.

In some embodiments of the disclosure, the device further includes an air blowing device, which is configured to blow air towards a lens of the industrial camera to remove dust on the lens of the industrial camera in a laser welding process.

In some embodiments of the disclosure, the device further includes black light absorption cotton, which is arranged above the half transparent and half reflecting mirror and the industrial camera and configured to absorb the incident light, transmitted by the half transparent and half reflecting mirror, of the coaxial light source.

In order to achieve the purpose, according to another aspect of the disclosure, a method for detecting a defect of a laser welding cover lens on an automobile production line is further provided, which includes that: a detection image is acquired, wherein the detection image is a detection image obtained by an industrial camera of a device for detecting a defect of the laser welding cover lens on the automobile production line as mentioned above; an external rectangle of a mirror plane region in the detection image is determined by feature matching; and bad point contour retrieval is performed in the external rectangle by threshold value setting to obtain a bad point area and a number of bad point pixel.

In some embodiments of the disclosure, before the operation that the external rectangle of the mirror plane region in the detection image is determined by feature matching, the method further includes that: whether there exists an image corresponding to the mirror plane region in the detection image or not is judged, wherein, if it is judged that there exists an image corresponding to the mirror plane region, the external rectangle of the mirror plane region in the detection image is determined by feature matching; and if it is judged that there exists no image corresponding to the mirror plane region, the detection image is reacquired.

In some embodiments of the disclosure, the operation that bad point contour retrieval is performed in the external rectangle by threshold value setting includes that: the bad point area is calculated and the bad point area is converted into the number of pixels, and after the bad point area and the number of bad point pixel are obtained, the method further includes that: whether the number of bad point pixel converted from the bad point area is more than or equal to a number of bad point pixel defined by a user or not is judged, if the number of bad point pixel converted from the bad point area is more than or equal to the number of bad point pixel defined by the user, bad point contours are marked, and whether a number of the bad point contours is more than or equal to a bad point number value defined by the user or not is judged, and if it is judged that the number of the bad point contours is more than or equal to the bad point number value defined by the user, the cover lens is prompted to be abnormal; if the number of bad point pixel converted from the bad point area is smaller than the number of bad point pixel defined by the user, the cover lens is prompted to be normal; and if the number of the bad point contours is smaller than the bad point number value defined by the user, the cover lens is prompted to be normal.

In some embodiments of the disclosure, before the operation that the detection image is acquired, the method further includes that: an instruction sent by a robot is received; and an identification numerical value of the instruction is judged, wherein there are two types of identification numerical values, wherein the detection image is acquired when the identification numerical value is of the first type, and air is blown to the industrial camera through an air blowing device when the identification numerical value is of the second type.

In order to achieve the purpose, according to another aspect of the disclosure, a device for detecting a defect of a laser welding cover lens on an automobile production line is further provided, which includes: an acquisition unit, which is configured to acquire a detection image, wherein the detection image is a detection image obtained by an industrial camera of a device for detecting a defect of the laser welding cover lens on the automobile production line as mentioned above; a determination unit, which is configured to determine an external rectangle of a mirror plane region in the detection image by feature matching; and a retrieval unit, which is configured to perform bad point contour retrieval in the external rectangle by threshold value setting to obtain a bad point area and a number of bad point pixel.

In some embodiments of the disclosure, the device further includes a judgment unit, which is configured to, before the external rectangle of the mirror plane region in the detection image is determined by feature matching, judge whether there exists an image corresponding to the mirror plane region in the detection image. If it is judged that there exists an image corresponding to the mirror plane region, the external rectangle of the mirror plane region in the detection image is determined by feature matching. If it is judged that there exists no image corresponding to the mirror plane region, the detection image is reacquired.

According to the disclosure, the coaxial light source is configured to emit the collimating detection light, the direction of the detection light being perpendicular to the preset horizontal direction; the half transparent and half reflecting mirror is arranged above the coaxial light source, and is configured to reflect the detection light to the preset position; the reflecting mirror receives the light reflected by the half transparent and half reflecting mirror and reflects the light reflected by the half transparent and half reflecting mirror to the cover lens; the industrial camera is parallel to the half transparent and half reflecting mirror and the reflecting mirror in a preset horizontal direction, and is configured to receive the incident light to obtain the detection image, wherein the incident light is formed from the detection light which is reflected by the cover lens and passes through the reflecting mirror and the half transparent and half reflecting mirror; and the processor is configured to perform calculation according to the detection image to determine whether there exists a bad point on the cover lens or not. The problem of incapability in timely learning about the cover lens is polluted during laser welding is solved, and an effect of timely learning about the bad point on the cover lens and replacing the cover lens is further achieved.

BRIEF DESCRIPTION OF THE DRAWINGS

The drawings forming a part of the application are adopted to provide a further understanding to the disclosure. Schematic embodiments of the disclosure and descriptions thereof are adopted to explain the disclosure and not intended to form improper limits to the disclosure. In the drawings.

DETAILED DESCRIPTION OF THE EMBODIMENTS

It is important to note that the embodiments in the disclosure and characteristics in the embodiments may be combined without conflicts. The disclosure will be described below with reference to the drawings and in combination with the embodiments in detail.

For making the solutions of the disclosure better understood, the technical solutions in the embodiments of the disclosure will be clearly and completely described below in combination with the drawings in the embodiments of the disclosures. Obviously, the described embodiments are not all embodiments but only part of embodiments of the disclosure. All other embodiments obtained by those of ordinary skilled in the art on the basis of the embodiments in the disclosure without creative work shall fall within the scope of protection of the disclosure.

It is important to note that terms "first", "second" and the like in the specification, claims and drawings of the disclosure are adopted no to describe a specific sequence or order but to distinguish similar objects. It should be understood that data used like this may be exchanged under a proper condition for the embodiments of the disclosure described here. In addition, terms "include" and "have" and any transformation thereof are intended to cover nonexclusive inclusions. For example, a process, method, system, product or equipment including a series of steps or units is not limited to those steps or units which are clearly listed, but may include other steps or units which are not clearly listed or intrinsic to these processes, methods, products or equipment.

An embodiment of the disclosure provides a device for detecting a defect of a laser welding cover lens on an automobile production line.

Figure 1:
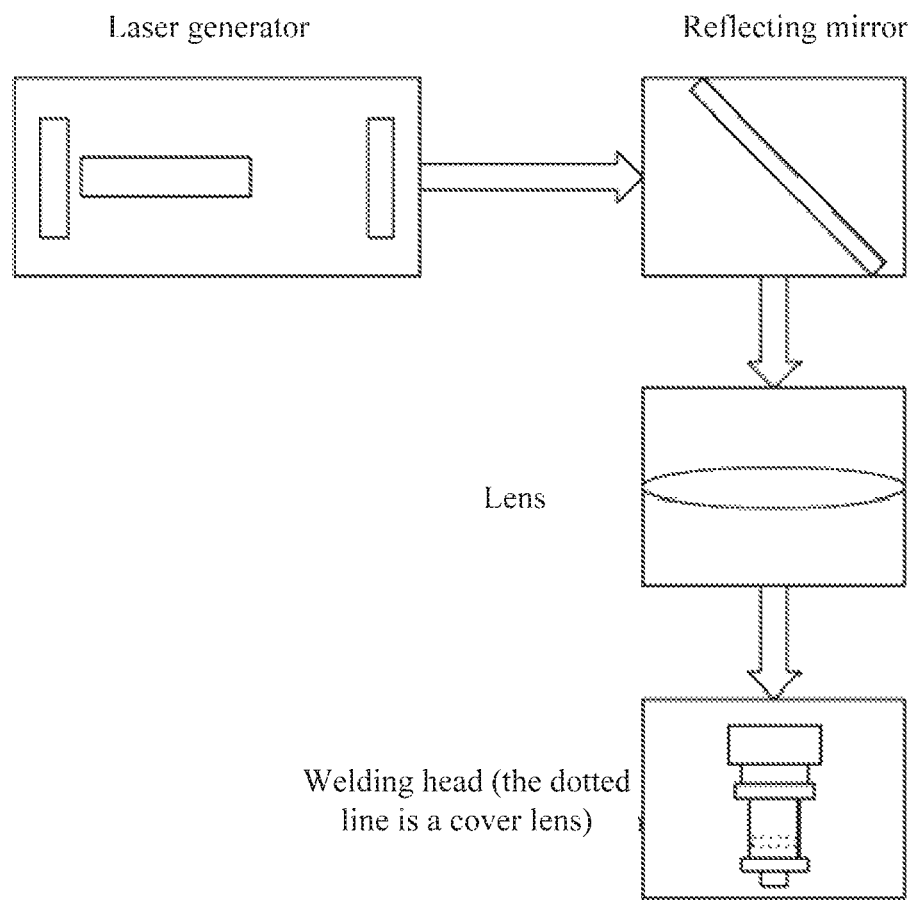
FIG. 1 is a diagram of an inner light path of a laser welding head according to the related technology.
Figure 2:
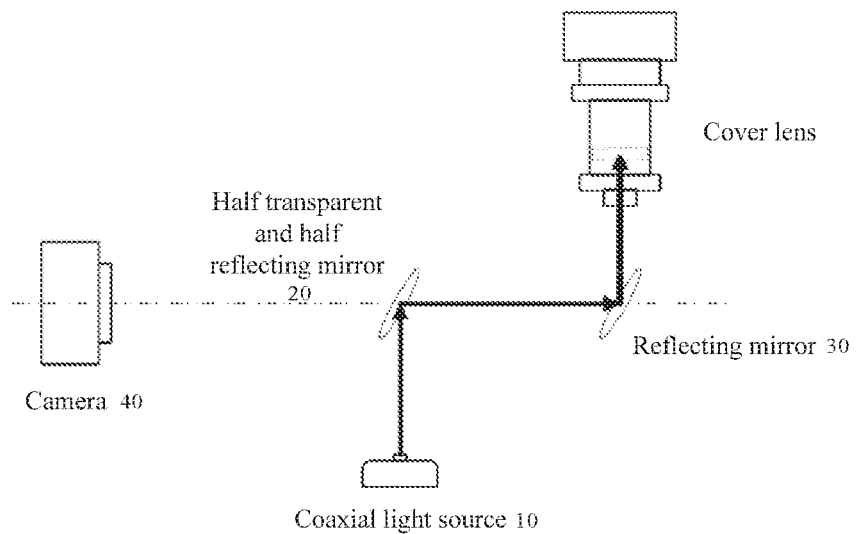
FIG. 2 is a schematic diagram of a device for detecting a defect of a laser welding cover lens on an automobile production line according to a first embodiment of the disclosure.

FIG. 2 is a schematic diagram of a device for detecting a defect of a laser welding cover lens on an automobile production line according to a first embodiment of the disclosure. As shown in FIG. 2, the device includes:

a coaxial light source 10, configured to emit collimating detection light, a direction of the detection light being perpendicular to a preset horizontal direction;

a half transparent and half reflecting mirror 20, arranged above the coaxial light source 10 and configured to reflect the detection light to a preset position;

a reflecting mirror 30, receiving the light reflected by the half transparent and half reflecting mirror 20 and reflecting the light reflected by the half transparent and half reflecting mirror 20 to the cover lens;

an industrial camera 40, parallel to the half transparent and half reflecting mirror 20 and the reflecting mirror in the preset horizontal direction and configured to receive incident light to obtain a detection image, wherein the incident light is formed from the detection light which is reflected by the cover lens and then passes through the reflecting mirror and the half transparent and half reflecting mirror; and a processor 50, configured to perform calculation according to the detection image to determine whether there exists a bad point on the cover lens or not.

Figure 3:
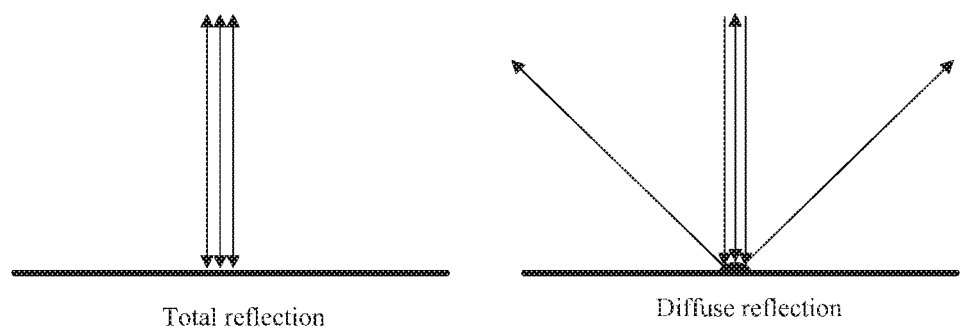
FIG. 3 is a principle diagram of total reflection and diffuse reflection of a protection mirror plane according to an embodiment of the disclosure.
Figure 4:
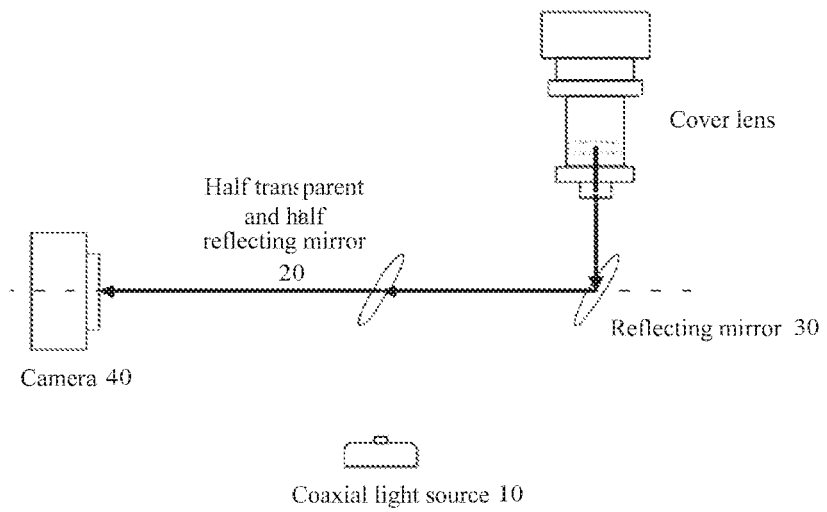
FIG. 4 is a schematic diagram of a light path principle according to an embodiment of the disclosure.

As shown in FIG. 2, the detection light emitted by the coaxial light source is reflected by the half transparent and half reflecting mirror and the reflecting mirror, and the light emitted by the light source is perpendicularly emitted onto the cover lens of a welding head. Compared with a conventional light source, the coaxial light source may provide more collimating detection light in a measurement light path, so that vision measurement accuracy and sensitivity are improved. Since the light source is a coaxial light source, the light is perpendicularly incident onto the cover lens in an inner light path through the half transparent and half reflecting mirror and the reflecting mirror. FIG. 3 is a principle diagram of total reflection and diffuse reflection of a cover lens plane according to an embodiment of the disclosure. As shown in FIG. 3, if the cover lens has no defect, and namely is a flat and smooth plane, total reflection on the protection mirror plane may occur. If the protection mirror plane has a defect, diffuse reflection on the protection mirror plane may occur. If the protection mirror plane is a smooth mirror plane, coaxial light is totally reflected on its surface, and the light returns along the original light path; and if the protection mirror plane has a bad point and presents a concave-convex mirror plane, the coaxial light is diffusely reflected here and not all of the light may return along the original light path. Therefore, during imaging at the camera, the light reflecting from the defect part of the cover lens is only part of all, so the image of defect part is dark. Under a total reflection condition, due to reversibility of the light path, all of the light is perpendicularly incident into the industrial camera through the reflecting mirror and the half transparent and half reflecting mirror, the principle diagram of the light path is shown in FIG. 4, and the light reflected by the cover lens is reflected by the reflecting mirror and reaches the industrial camera through the half transparent and half reflecting mirror for imaging in the camera. From the light path, it can be seen that, if impurities are attached to the cover lens, the incident light may not be reflected at the concave-convex detect part according to the original light path, and thus there is only a small part of light finally entering the camera at the part. Therefore, a corresponding imaging position of the concave-convex part in the camera should be a dark point, also called as a bad point, and whether there exists a bad point on the cover lens or not may be judged according to camera imaging.

According to the embodiment, the coaxial light source 10 is configured to emit the collimating detection light, the direction of the detection light being perpendicular to the preset horizontal direction; the half transparent and half reflecting mirror 20 is arranged above the coaxial light source 10, and is configured to reflect the detection light to the preset position; the reflecting mirror 30 reflects the light reflected by the half transparent and half reflecting mirror 20 to the cover lens; the industrial camera 40 is parallel to the half transparent and half reflecting mirror 20 and the reflecting mirror in a preset horizontal direction, and is configured to receive the incident light to obtain the detection image, wherein the incident light formed from the detection light which is reflected by the cover lens and passes through the reflecting mirror and the half transparent and half reflecting mirror; and the processor 50 is configured to perform calculation according to the detection image to determine whether there exists a bad point on the cover lens or not. The problem of incapability in timely learning about the cover lens is polluted during laser welding is solved, and an effect of learning about the bad point on the cover lens and timely replacing the cover lens is further achieved.

The device for detecting a defect of the laser welding cover lens on the automobile production line in the embodiment of the disclosure may be adopted for defect detection of cover lens in the laser welding head on the automobile production line, and may solve a problem about automatic detection of the defect of the cover lens in the laser welding head during a laser welding operation, may be applied to all laser welding heads with cover lens on the automobile production line, ensures timely warning about the defect of the cover lens in the laser welding head during the welding operation, and also greatly reduces a rate of returning bodies in white to the production line for repair.

Figure 5:
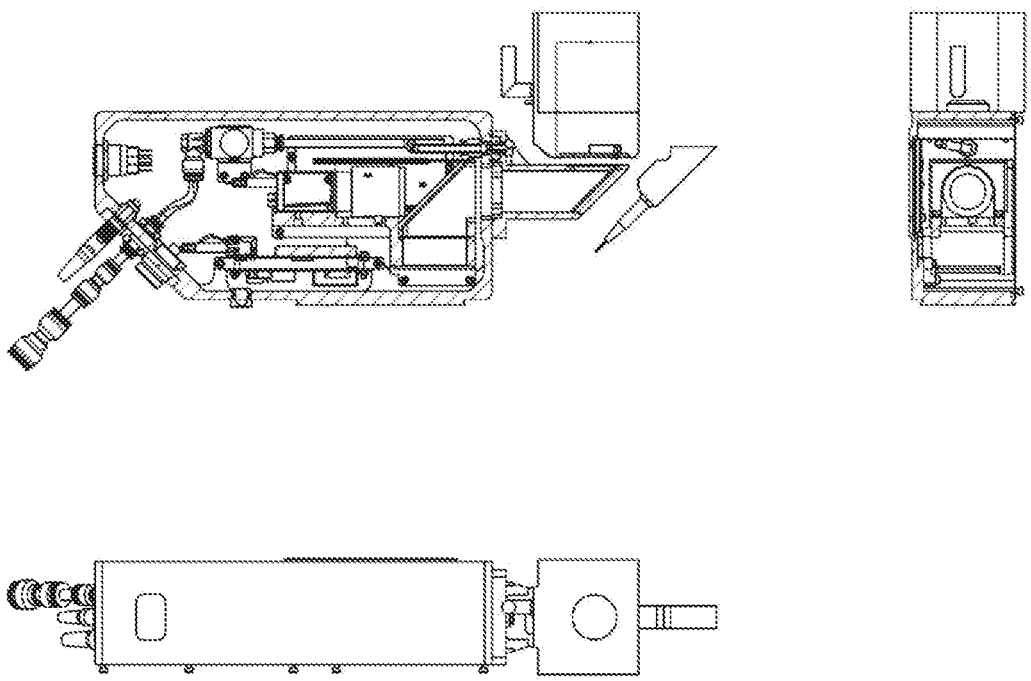
FIG. 5 is a sectional view of a device for detecting a defect of a laser welding cover lens on an automobile production line according to an embodiment of the disclosure.

Optionally, the device for detecting a defect of the laser welding cover lens on the automobile production line further includes an air blowing device, configured to blow air to a lens of the industrial camera in a laser welding process, so that dust on the lens of the industrial camera may be cleared. Blowing air to the camera lens of the camera may reduce an error judgment caused by splattering of impurity particles in the welding process to the camera lens of the camera and make a detection result more accurate. FIG. 5 is a sectional view of a device for detecting a defect of a laser welding cover lens on an automobile production line according to an embodiment of the disclosure. As shown in FIG. 5, during an online operation of the laser welding head, the equipment may change to an air blowing mode, dust removal is performed by using an air source of a factory, and after the laser welding head completes the operation, defect detection is directly performed. Arrangement of the air blowing device may not waste time.

Figure 6:
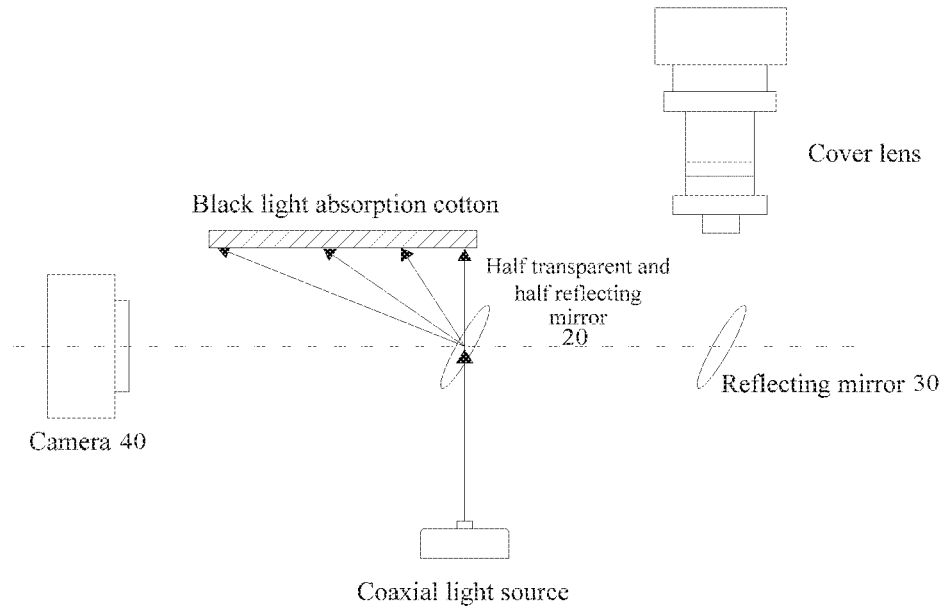
FIG. 6 is a schematic diagram of an arrangement position of light absorption cotton according to an embodiment of the disclosure.

Optionally, the device for detecting a defect of the laser welding cover lens on the automobile production line in the embodiment of the disclosure further includes black light absorption cotton. FIG. 6 is a schematic diagram of an arrangement position of light absorption cotton according to an embodiment of the disclosure. As shown in FIG. 6, the black light absorption cotton is arranged above the half transparent and half reflecting mirror and the industrial camera, and is configured to absorb the incident light, transmitted by the half transparent and half reflecting mirror, of the coaxial light source and improves accuracy of a testing result.

Figure 7:
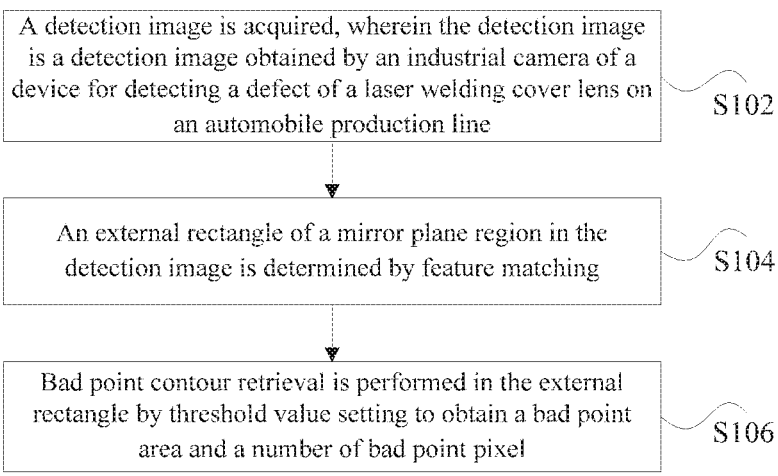
FIG. 7 is a flowchart of a method for detecting a defect of a laser welding cover lens on an automobile production line according to a first embodiment of the disclosure.

An embodiment of the disclosure further provides a method for detecting a defect of a laser welding cover lens on an automobile production line. FIG. 7 is a flowchart of a method for detecting a defect of a laser welding cover lens on an automobile production line according to a first embodiment of the disclosure. As shown in FIG. 7, the method includes the following steps. In Step S102, a detection image is acquired, wherein the detection image is a detection image obtained by an industrial camera of a device for detecting a defect of the laser welding cover lens on the automobile production line.

In Step S104, an external rectangle of a mirror plane region in the detection image is determined by feature matching.

In Step S106, bad point contour retrieval is performed in the external rectangle by threshold value setting to obtain a bad point area and a number of bad point pixel.

In the embodiment of the disclosure, the detection image is a detection image in the industrial camera in the device for detecting a defect of the laser welding cover lens on the automobile production line in the embodiment, the external rectangle of the round mirror plane region in the detection image is arranged in a feature matching manner after the detection image is acquired, detection is performed again if it is detected that the round mirror plane region of the detection image is incomplete, and if the round mirror plane region in the detection image may be positioned, the external rectangle of the round mirror plane region is determined and bad point contour retrieval is performed in the region in the external rectangle by threshold value setting to obtain the bad point area and number of bad point pixel in the external rectangle. By such a method, bad points generated by impurities on the cover lens may be timely acquired, and whether the cover lens is required to be replaced or not is timely determined.

After the mirror plane region in the image is positioned, the external rectangle may be determined as an interesting region, and the interesting region is determined as a working region for image recognition.

Figure 8:
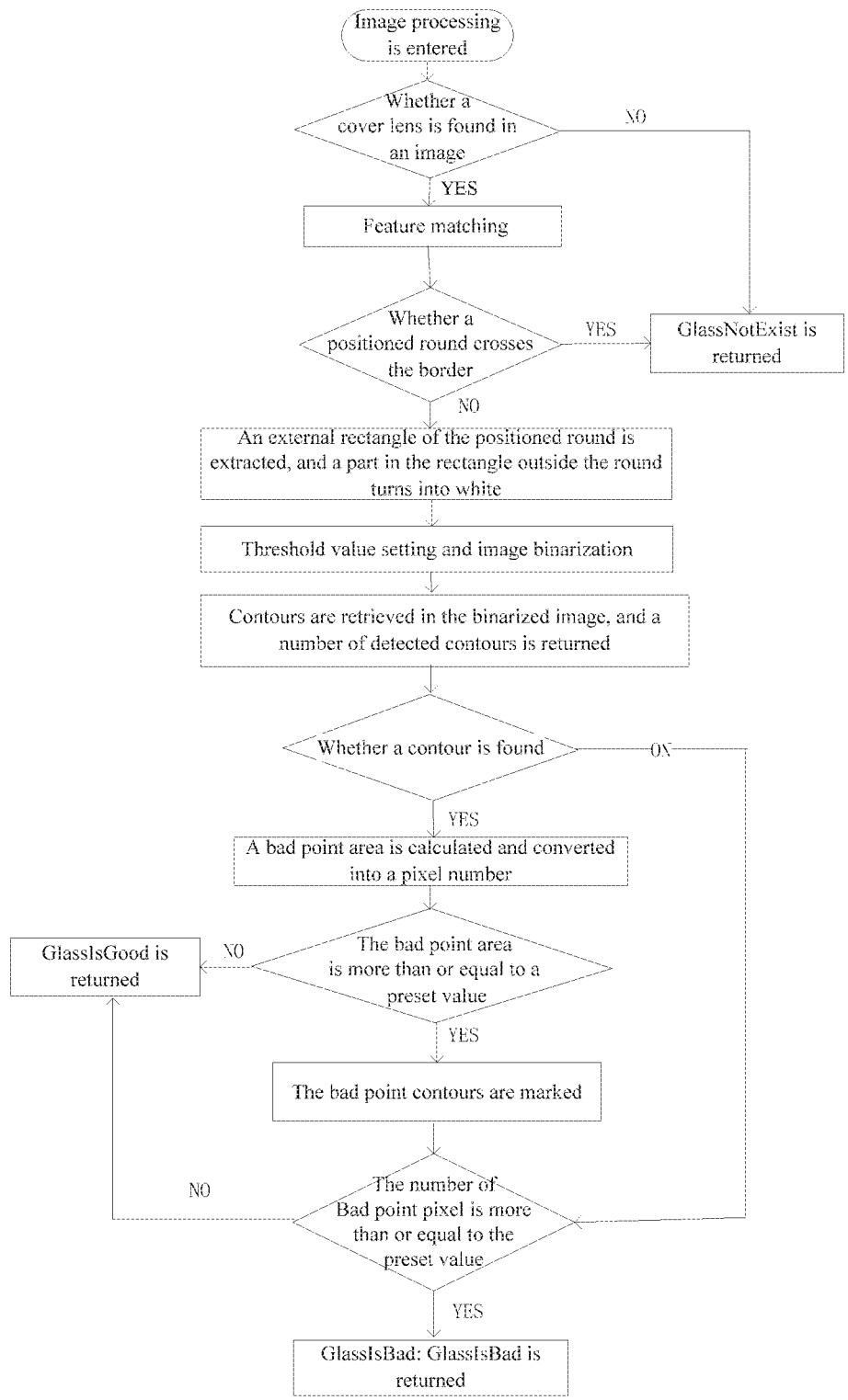
FIG. 8 is a flowchart of a method for detecting a defect of a laser welding cover lens on an automobile production line according to a second embodiment of the disclosure.

FIG. 8 is a flowchart of a method for detecting a defect of a laser welding cover lens on an automobile production line according to a second embodiment of the disclosure. The embodiment may be determined as a preferred implementation mode of the first embodiment. As shown in FIG. 8, the method includes the following steps.

After an image processing algorithm flow is entered, the cover lens is sought in the image. The coaxial light may be transmitted and reflected into the industrial camera, so that the lens in the image should be bright white. If it is found, the mirror plane region is detected by a feature matching method, and whether the positioned region crosses the border or not is judged. If the border is crossed, it is prompted that there exists no lens, and if the border is not crossed, the external rectangle of the positioned region is extracted. Threshold value setting is performed to further retrieve bad point contours in the external rectangle. A retrieved bad point pixel area is finally calculated and compared with a manually preset bad point area to obtain a final bad point judgment result, if the bad point area is larger than a bad point pixel value (i.e., a preset value) defined by the user, the bad point contours are marked and whether a number of bad points is more than or equal to a pixel number value defined by the user or not is judged, if a judgment result is YES, the cover lens is prompted to be abnormal (Glass Is Bad), and if the judgment result is NO, the cover lens is prompted to be normal (Glass Is Good).

Optionally, before the mirror plane region in the detection image is positioned by feature matching, whether there exists an image corresponding to the mirror plane region in the detection image or not is judged, wherein, if it is judged that there exists an image corresponding to the mirror plane region, the mirror plane region in the detection image is positioned by feature matching; and if it is judged that there exists no image corresponding to the mirror plane region, the detection image is reacquired.

Optionally, the operation that bad point contour retrieval is performed in the external rectangle by threshold value setting includes that: the bad point area is calculated and the bad point area is converted into the number of pixels; and after the bad point area and the number of bad point pixel are obtained, whether the bad point area is more than or equal to a number of bad point pixel defined by a user or not is judged, if the bad point area is more than or equal to the number of bad point pixel defined by the user, bad point contours are marked, and whether a number of bad points is more than or equal to a bad point number value defined by the user or not is judged, and if it is judged that the number of the bad point contours is more than or equal to the bad point number value defined by the user, the cover lens is prompted to be abnormal.

If the bad point area is more than or equal to the number of bad point pixel defined by the user or not is judged, if the bad point area is smaller than the number of bad point pixel defined by the user, the cover lens is prompted to be normal, and after whether the number of bad point pixel is more than or equal to the bad point number value defined by the user or not is judged, if the number of bad point pixel is smaller than the bad point number value defined by the user, the cover lens is prompted to be normal.

Optionally, before the detection image is acquired, an instruction sent by a robot is received; and an identification numerical value of the instruction is judged, wherein there are two types of identification numerical values, wherein the detection image is acquired when the identification numerical value is of the first type, and air is blown to the lens of the industrial camera through an air blowing device when the identification numerical value is of the second type, so that a dust removing effect is achieved.

Figure 9:
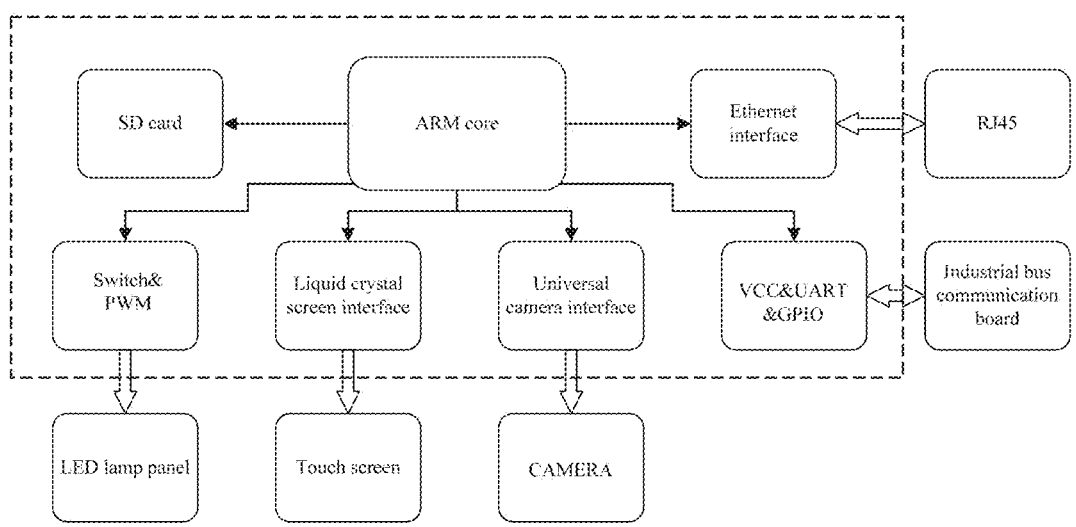
FIG. 9 is a schematic diagram of a hardware structure of a device for detecting a defect of a laser welding cover lens on an automobile production line according to an embodiment of the disclosure.

An embodiment of the disclosure further provides a hardware structure of a device for detecting a defect of a laser welding cover lens on an automobile production line. FIG. 9 is a schematic diagram of a hardware structure of a device for detecting a defect of a laser welding cover lens on an automobile production line according to an embodiment of the disclosure. As shown in FIG. 9, a hardware platform of the embodiment of the disclosure uses an Advanced Reduced Instruction-Set Computer (RISC) Machine (ARM) chip as a main core, and a processor of another type shall also fall within the scope of protection of the disclosure. A sensor of the embodiment of the disclosure may directly communicate with a robot or a Programmable Logic Controller (PLC), is compatible with at present mainstream industrial communication protocol, and is simultaneously connected with a series of peripherals such as a touch screen and a CAMERA to realize a core function. An applied external storage medium may be a Secure Digital (SD) card.

Figure 10:
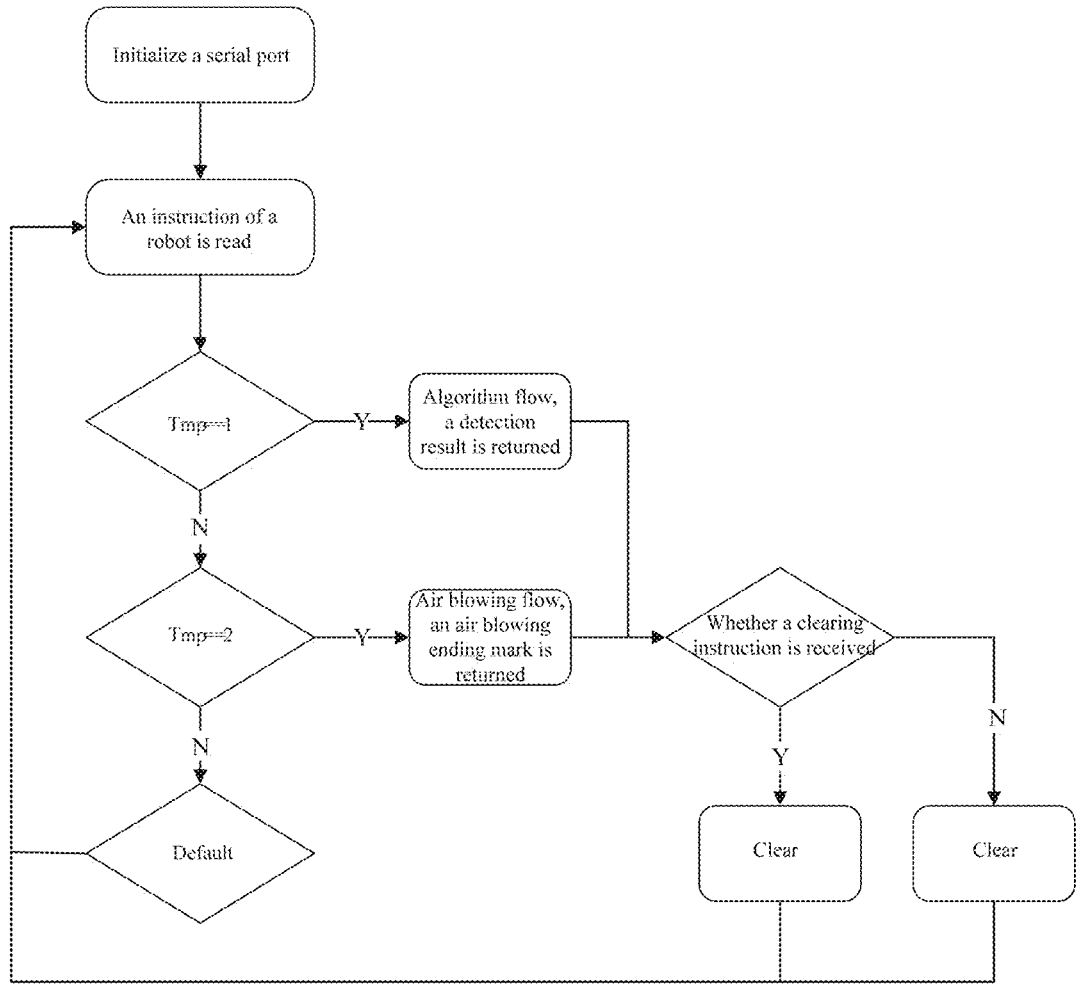
FIG. 10 is a flowchart of hardware communication according to an embodiment of the disclosure.

FIG. 10 is a flowchart of hardware communication according to an embodiment of the disclosure. As shown in FIG. 10, the whole flow includes the following two branch flows: 1) a detection flow and 2) an air blowing flow.

Selective starting of the detection flow and the air blowing flow is implemented completely by the instruction sent by the robot. When a mark Tmp is 1, the detection flow branch is entered; and the mark Tmp is 2, the air blowing flow branch is entered.

The Air Blowing Flow

Dust on a lens of the sensor may bring influence to a testing effect, and dust removing work is required by each measurement beat. A dust removing method adopts the air blowing manner, and the sensor is required to introduce the air source of the factory. The sensor controls an electromagnetic valve to do air blowing dust removing work before each measurement. When Tmp is not 2, an error (Default) is prompted.

The equipment has a dust removing function. The air blowing flow and laser welding are implemented at the same time, for a purpose of preventing welding slag in the laser welding process from splattering onto the camera of the detection equipment to cause bad point misjudgments. When welding is stopped, the air blowing flow is also stopped.

Figure 11:
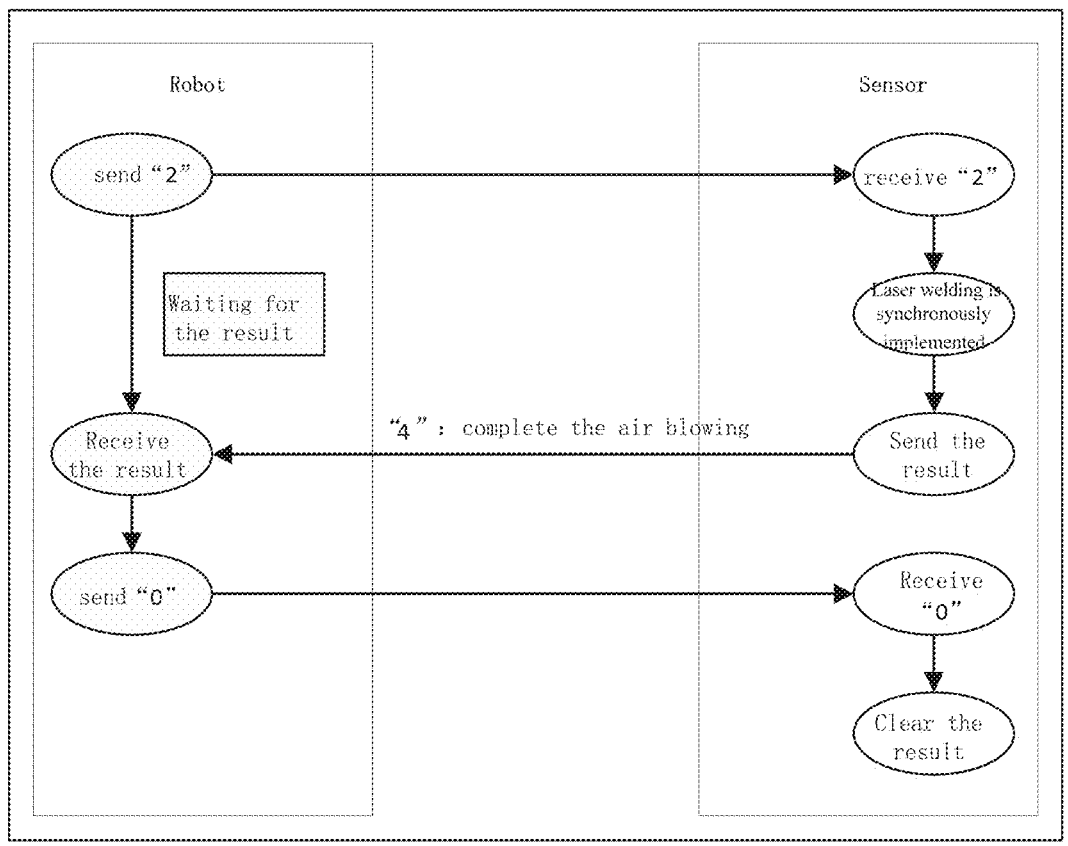
FIG. 11 is a flowchart of an air blowing interaction process of a robot and a sensor according to an embodiment of the disclosure.

FIG. 11 is a flowchart of an air blowing interaction process of a robot and a sensor according to an embodiment of the disclosure. As shown in FIG. 11, the robot sends the instruction to the sensor, the air blowing process and laser welding are synchronously implemented, the sensor sends a result to the robot after acquisition is completed, the robot simultaneously receives the result obtained by air blowing, the robot sends a clearing instruction "0" to the sensor, and the sensor clears the stored result after receiving the clearing instruction.

Figure 12:
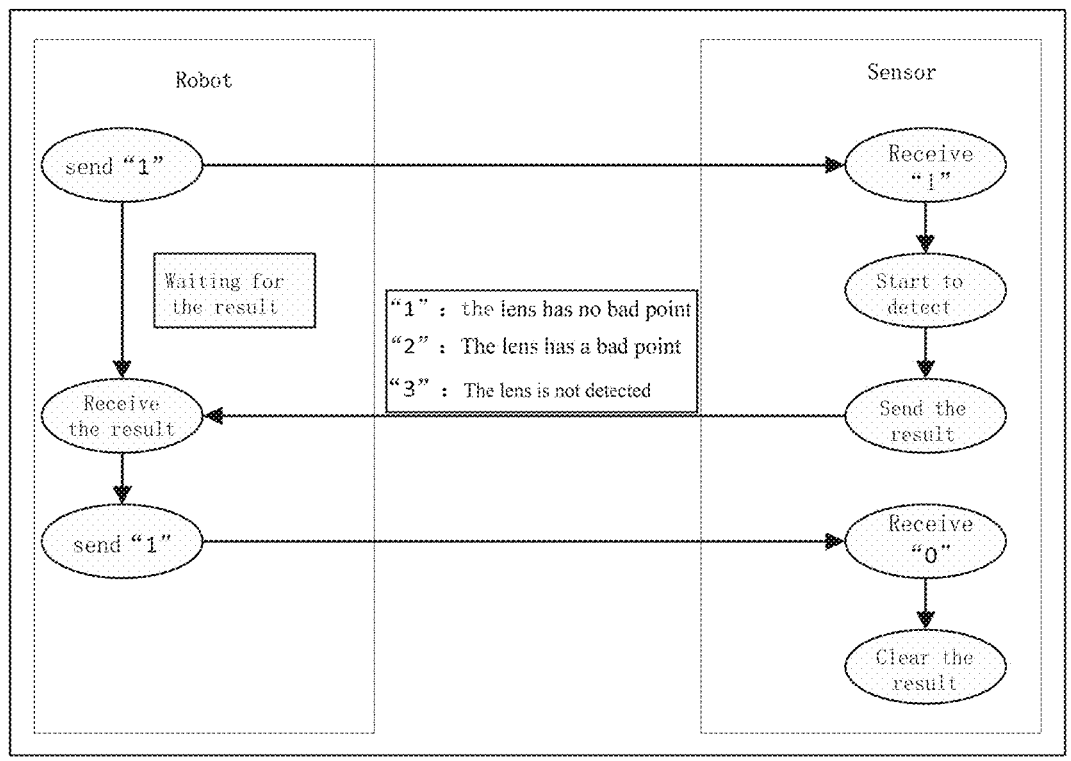
FIG. 12 is a flowchart of image detection of a sensor controlled by a robot according to an embodiment of the disclosure.

FIG. 12 is a flowchart of controlling image detection of a sensor by a robot according to an embodiment of the disclosure. As shown in FIG. 12, the coaxial light source is used to illuminate the lens, the camera acquires a measurement image, whether there exists a bad point on the lens or not is detected through an embedded processing system in combination with a customized image analysis algorithm, the measurement image and the detection result (whether there is a bad point or not and a position and size of the bad point) are displayed on a Light Emitting Diode (LED) display screen of the sensor, and the detection result is simultaneously fed back to the robot. The detection flow is started every time when the laser welding head reaches a detection position.

Figure 13:
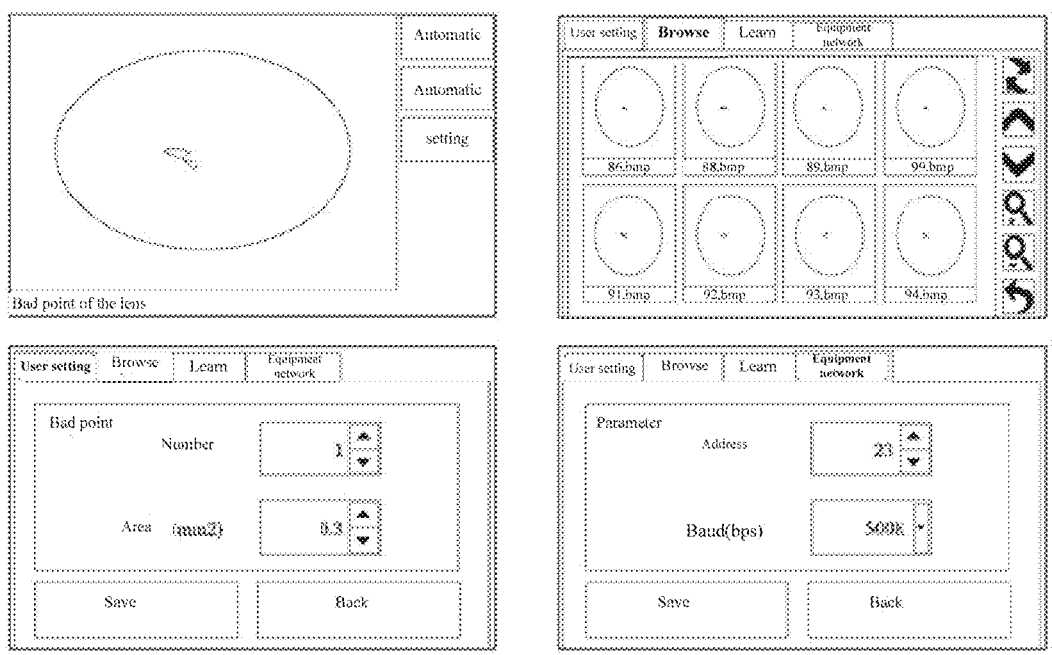
FIG. 13 is an interface diagram of embedded human-computer interaction software according to an embodiment of the disclosure.

FIG. 13 is an interface diagram of embedded human-computer interaction software according to an embodiment of the disclosure. As shown in FIG. 13, a human-computer interaction function of the equipment is realized by the touch screen and embedded software. In the embedded software, the bad point on the lens is accurately found in real time through an accurate simulation image processing algorithm. Moreover, the user may observe a bad point detection condition in real time through a user interface, autonomously define the bad point area and number, browse a bad point image and the like.

According to the method for detecting a defect of the laser welding cover lens on the automobile production line in the embodiment of the disclosure, mirror plane defect detection over cover lenses of laser welding heads may be performed on all automobile production lines adopting laser welding, static defect detection is performed on the cover lenses of the laser welding heads in operation, detection results are provided at first time, and feedbacks are given to an upper robot. The method is simple in structure, low in algorithm complexity, lower in robot trajectory debugging workload, convenient and simple in calibration process and shorter in occupied time.

It is important to note that the steps shown in the flowcharts of the drawings may be executed in a computer system, for example, a set of computers capable of executing instructions, and moreover, although logic sequences are shown in the flowcharts, the shown or described steps may be executed in sequences different from those described here under some conditions.

An embodiment of the disclosure provides a device for detecting a defect of a laser welding cover lens on an automobile production line. The device may be adopted to execute the method for detecting a defect of the laser welding cover lens on the automobile production line in the embodiment of the disclosure.

Figure 14:
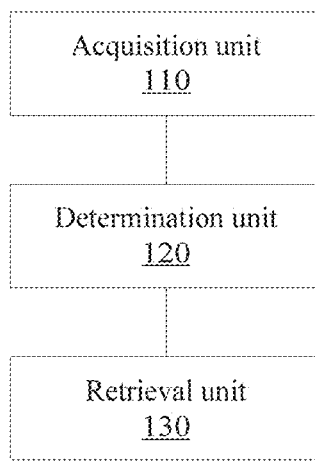
FIG. 14 is a schematic diagram of a device for detecting a defect of a laser welding cover lens on an automobile production line according to an embodiment of the disclosure.

FIG. 14 is a schematic diagram of a device for detecting a defect of a laser welding cover lens on an automobile production line according to an embodiment of the disclosure. As shown in FIG. 14, the device includes:

an acquisition unit 110, configured to acquire a detection image, wherein the detection image is a detection image obtained by an industrial camera of a defect detection device of the embodiment of the disclosure for the laser welding cover lens on the automobile production line;

a determination unit 120, configured to determine an external rectangle of a mirror plane region in the detection image by feature matching; and a retrieval unit 130, configured to perform bad point contour retrieval in the external rectangle by threshold value setting to obtain a bad point area and a number of bad point pixel.

Optionally, the device further includes: a judgment unit, configured to, before the external rectangle of the mirror plane region in the detection image is determined by feature matching, judge whether there exists an image corresponding to the mirror plane region in the detection image or not, wherein, if it is judged that there exists an image corresponding to the mirror plane region, the external rectangle of the mirror plane region in the detection image is determined by feature matching; and if it is judged that there exists no image corresponding to the mirror plane region, the detection image is reacquired.

By the device for detecting a defect of the laser welding cover lens on the automobile production line in the embodiment of the disclosure, the problem of incapability in timely learning about the cover lens is polluted during laser welding is solved, and an effect of learning about the bad point on the cover lens and timely replacing the cover lens is further achieved.

Those skilled in the art should know that the embodiment of the disclosure may be provided as a method, a system or a computer program product. Therefore, the disclosure may adopt a form of pure hardware embodiment, pure software embodiment and combined software and hardware embodiment.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

It is also important to note that terms "include" and "have" or any variant thereof is intended to cover nonexclusive inclusions, so that a process, method, commodity or equipment including a series of elements not only includes those elements but also include other elements which are not clearly listed, or further includes elements intrinsic to the process, the method, the commodity or the equipment. Under the condition of no more limits, an element limited by a sentence "includes a/an" does not exclude the condition that there still exists another element which is the same in a process, method, commodity or equipment including the element.

Those skilled in the art should know that the embodiment of the disclosure may be provided as a method, a system or a computer program product. Therefore, the disclosure may adopt a form of pure hardware embodiment, pure software embodiment and combined software and hardware embodiment.

The above is only the embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of the claims of the disclosure.

INDUSTRIAL APPLICABILITY

According to the disclosure, the coaxial light source emits the collimating detection light, the direction of the detection light being perpendicular to the preset horizontal direction; the half transparent and half reflecting mirror is arranged above the coaxial light source, and is configured to reflect the detection light to the preset position; the reflecting mirror receives the light reflected by the half transparent and half reflecting mirror and reflects the light reflected by the half transparent and half reflecting mirror to the cover lens; the industrial camera is parallel to the half transparent and half reflecting mirror and the reflecting mirror in a present horizontal direction, and is configured to receive the incident light to obtain the detection image, wherein the incident light is formed from the detection light which is reflected by the cover lens and passes through the reflecting mirror and the half transparent and half reflecting mirror; and the processor is configured to perform calculation according to the detection image to determine whether there exists a bad point on the cover lens or not. The problem of incapability in timely learning about the cover lens is polluted during laser welding is solved, and an effect of learning about the bad point on the cover lens and timely replacing the cover lens is further achieved.

What is claimed is:

1. A device for detecting a defect of a laser welding cover lens on an automobile production line, comprising:
   a coaxial light source, configured to emit collimating detection light, a direction of the detection light being perpendicular to a preset horizontal direction;
   a half transparent and half reflecting mirror, arranged above the coaxial light source and configured to reflect the detection light to a preset position;
   a reflecting mirror, configure to receive the light reflected by the half transparent and half reflecting mirror and reflecting the light reflected by the half transparent and half reflecting mirror to the cover lens;
   an industrial camera, parallel to the half transparent and half reflecting mirror and the reflecting mirror in the preset horizontal direction and configured to receive incident light to obtain a detection image, wherein the incident light is formed from the detection light which is reflected by the cover lens and then passes through the reflecting mirror and the half transparent and half reflecting mirror; and
   a processor, configured to acquire the detection image, determine an external rectangle of a mirror plane region in the detection image by feature matching, and perform bad point contour detection in the external rectangle by threshold value setting to obtain a bad point area and a number of bad point pixel.

2. The device as claimed in claim 1, further comprising:
   an air blowing device, configured to blow air towards a lens of the industrial camera in the device to remove dust on the lens.

3. The device as claimed in claim 1, further comprising:
   black light absorption cotton, arranged above the half transparent and half reflecting mirror and the industrial camera and configured to absorb the incident light, transmitted by the half transparent and half reflecting mirror, of the coaxial light source.

4. A device for detecting a defect of a laser welding cover lens on an automobile production line, wherein the device comprises a processor and memory, and the processor is configured to execute software units stored in the memory, the software units comprising:
- an acquisition unit, configured to acquire a detection image, wherein the detection image is an image obtained by an industrial camera in the defect detection device for the laser welding cover lens on the automobile production line as claimed in claim 1;
- a determination unit, configured to determine an external rectangle of a mirror plane region in the detection image by feature matching; and
- a detection unit, configured to perform bad point contour detection in the external rectangle by threshold value setting to obtain a bad point area and a number of bad point pixel.

5. The device as claimed in claim 4, the software units further comprising:
- a judgment unit, configured to, before the external rectangle of the mirror plane region in the detection image is determined by feature matching, judge whether there exists an image that includes the mirror plane region, wherein
- when it is judged that there exists an image that includes the mirror plane region, the external rectangle of the mirror plane region in the detection image is determined by feature matching; and
- when it is judged that the image does not include the mirror plane region, the detection image is reacquired.

6. A method for detecting a defect of a laser welding cover lens on an automobile production line, applied to a device for detecting a defect of the laser welding cover lens on the automobile production line, the device comprising:
- a coaxial light source, configured to emit collimating detection light, a direction of the detection light being perpendicular to a preset horizontal direction;
- a half transparent and half reflecting mirror, arranged above the coaxial light source and configured to reflect the detection light to a preset position;
- a reflecting mirror, configure to receive the light reflected by the half transparent and half reflecting mirror and reflecting the light reflected by the half transparent and half reflecting mirror to the cover lens;
- an industrial camera, parallel to the half transparent and half reflecting mirror and the reflecting mirror in the preset horizontal direction and configured to receive incident light to obtain a detection image, wherein the incident light is formed from the detection light which is reflected by the cover lens and then passes through the reflecting mirror and the half transparent and half reflecting mirror;

the method comprising:
- acquiring a detection image, wherein the detection image is a detection image obtained by the industrial camera of the device for detecting a defect of the laser welding cover lens on the automobile production line;
- determining an external rectangle of a mirror plane region in the detection image by feature matching; and
- performing bad point contour detection in the external rectangle by threshold value setting to obtain a bad point area and a number of bad point pixel.

7. The method as claimed in claim 6, before determining the external rectangle of the mirror plane region in the detection image by feature matching, comprising:
- judging whether there exists an image corresponding to the mirror plane region in the detection image,
- when it is judged that there exists the image corresponding to the mirror plane region, determining the external rectangle of the mirror plane region in the detection image by feature matching; when it is judged that there exists no image corresponding to the mirror plane region, reacquiring the detection image.

8. The method as claimed in claim 6, wherein
performing bad point contour detection in the external rectangle by threshold value setting comprises: calculating the bad point area and converting the bad point area into the number of pixels, and
after the bad point area and the number of bad point pixel are obtained, the method further comprises: judging whether the number of bad point pixel converted from the bad point area is more than or equal to a number of bad point pixel defined by a user, when the number of bad point pixel converted from the bad point area is more than or equal to the number of bad point pixel defined by the user, marking bad point contours, and
judging whether a number of the bad point contours is more than or equal to a bad point number value defined by the user, and when it is judged that the number of the bad point contours is more than or equal to the bad point number value defined by the user, prompting that the cover lens is abnormal;
when the number of bad point pixel converted from the bad point area is smaller than the number of bad point pixel defined by the user, prompting that the cover lens is normal;
and when the number of the bad point contours is smaller than the bad point number value defined by the user, prompting that the cover lens is normal.

9. The method as claimed in claim 6, before acquiring the detection image, further comprising:
- receiving an instruction sent by a robot; and
- judging an identification numerical value of the instruction, wherein there are two types of identification numerical values;
- acquiring the detection image when the identification numerical value is of the first type, and blowing air to the industrial camera through an air blowing device when the identification numerical value is of the second type.

* * * * *